United States Patent
Sokeila et al.

(10) Patent No.: US 10,250,811 B2
(45) Date of Patent: Apr. 2, 2019

(54) METHOD, APPARATUS AND COMPUTER PROGRAM PRODUCT FOR CAPTURING IMAGES

(71) Applicant: Nokia Technologies Oy, Espoo (FI)

(72) Inventors: Tomi Sokeila, Tampere (FI); Mikko Muukki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/541,751

(22) Filed: Nov. 14, 2014

(65) Prior Publication Data
US 2015/0138406 A1    May 21, 2015

(30) Foreign Application Priority Data
Nov. 18, 2013 (GB) .................................. 1320277.5

(51) Int. Cl.
| | | |
|---|---|---|
| *H04N 9/09* | (2006.01) | |
| *H04N 5/225* | (2006.01) | |
| *H04N 5/232* | (2006.01) | |

(52) U.S. Cl.
CPC ....... *H04N 5/23293* (2013.01); *H04N 5/2258* (2013.01); *H04N 5/23245* (2013.01); *H04N 9/09* (2013.01)

(58) Field of Classification Search
None
See application file for complete search history.

(56) References Cited

U.S. PATENT DOCUMENTS

| 5,926,218 A | 7/1999 | Smith |
|---|---|---|
| 6,639,626 B1 | 10/2003 | Kubo et al. |
| 2002/0030749 A1 | 3/2002 | Nakamura et al. |
| 2004/0070679 A1* | 4/2004 | Pope .................. H04N 1/2112 348/231.99 |

(Continued)

FOREIGN PATENT DOCUMENTS

| EP | 2123024 A1 | 11/2009 |
|---|---|---|
| EP | 2302901 A2 | 3/2011 |

(Continued)

OTHER PUBLICATIONS

Chris Newman's Internet Draft "Date and Time on the Internet", Sep. 15, 1997, "https://www.w3.org/TR/NOTE-datetime".*

(Continued)

*Primary Examiner* — Roberto Velez
*Assistant Examiner* — Quan Pham
(74) *Attorney, Agent, or Firm* — Harrington & Smith (57) ABSTRACT

In an example embodiment, a method, apparatus and computer program product are provided. The method comprises generating a preview of a scene by a first camera of an apparatus in a first mode, and generating one or more image frames of the scene by at least one second camera of the apparatus in the first mode. The method comprises selecting at least one image frame from the one or more image frames as at least one capture image in a second mode. The apparatus includes at least one processor and at least one memory comprising computer program code, to perform generating the preview of the scene by the first camera in the first mode, generating image frames of the scene by the at least one second camera in the first mode; and selecting the at least one capture image from the image frames in the second mode.

18 Claims, 5 Drawing Sheets

(56) References Cited

U.S. PATENT DOCUMENTS

| | | |
|---|---|---|
| 2008/0095523 A1 | 4/2008 | Schilling-Benz et al. |
| 2008/0211941 A1 | 9/2008 | Deever et al. |
| 2008/0218612 A1 | 9/2008 | Border et al. |
| 2008/0219654 A1 | 9/2008 | Border et al. |
| 2008/0284866 A1 | 11/2008 | Mizutani |
| 2011/0261228 A1 | 10/2011 | Peng et al. |
| 2012/0268624 A1 | 10/2012 | Denisenkov et al. |
| 2013/0208143 A1* | 8/2013 | Chou .................. H04N 1/212 348/231.99 |
| 2013/0258136 A1* | 10/2013 | Lee .................. H04N 5/772 348/231.99 |
| 2014/0111662 A1* | 4/2014 | Mashiah ............. G06T 13/80 348/220.1 |
| 2014/0267816 A1* | 9/2014 | Baek ................ H04N 5/2258 348/218.1 |

FOREIGN PATENT DOCUMENTS

| | | |
|---|---|---|
| EP | 2670127 A1 | 12/2013 |
| WO | 2008/112051 A1 | 9/2008 |

OTHER PUBLICATIONS

Extended European Search Report received for corresponding European Patent Application No. 14192621.2, dated Apr. 1, 2015, 9 pages.

"T-Mobile Mytouch 4G Slide Review", Engadget, Retrieved on Feb. 6, 2015, Webpage available at : http://www.engadget.com/2011/08/02/t-mobile-mytouch-4g-slide-review.

* cited by examiner

METHOD, APPARATUS AND COMPUTER PROGRAM PRODUCT FOR CAPTURING IMAGES

TECHNICAL FIELD

Various implementations relate generally to method, apparatus, and computer program product for capturing images in electronic devices.

BACKGROUND

Various electronic devices such as cameras, mobile phones, and other devices are widely used for capturing image of a scene. In some implementations, for capturing an image in a device, a user first triggers (for example, by pressing a camera button or by providing touch input on a user interface) a half shutter to perform focus and then the user triggers a full shutter at a desired time to take the image. The device switches from a preview mode to a capture mode and this switching process requires some time in addition to the time delay between triggering the shutter and when the image is actually recorded. Hence, the user is able to record the image at a time delayed by some extent from the time the shutter is pressed. Such delay is referred to as a 'shutter lag'. In various exemplary implementations, efforts have been made to exclude the switching process from the preview mode to the capture mode to reduce the shutter lag. However, these exemplary implementations are not conducive for use in devices having large sensors, and for capturing images in low light conditions.

SUMMARY OF SOME EMBODIMENTS

Various aspects of examples embodiments are set out in the claims.

In a first aspect, there is provided a method comprising: generating a preview of a scene by a first camera of an apparatus in a first mode of the apparatus; generating one or more image frames of the scene by at least one second camera of the apparatus in the first mode; and selecting at least one image frame from the one or more image frames of the scene as at least one capture image in a second mode of the apparatus.

In a second aspect, there is provided an apparatus comprising at least one processor; and at least one memory comprising computer program code, the at least one memory and the computer program code configured to, with the at least one processor, cause the apparatus to perform at least: generate a preview of a scene by a first camera of an apparatus in a first mode of the apparatus; generate one or more image frames of the scene by at least one second camera of the apparatus in the first mode; and select at least one image frame from the one or more image frames of the scene as at least one capture image in a second mode of the apparatus.

In a third aspect, there is provided a computer program product comprising at least one computer-readable storage medium, the computer-readable storage medium comprising a set of instructions, which, when executed by one or more processors, cause an apparatus to perform at least: generate a preview of a scene by a first camera of an apparatus in a first mode of the apparatus; generate one or more image frames of the scene by at least one second camera of the apparatus in the first mode; and select at least one image frame from the one or more image frames of the scene as at least one capture image in a second mode of the apparatus.

In a fourth aspect, there is provided an apparatus comprising: means for generating a preview of a scene by a first camera of an apparatus in a first mode of the apparatus; means for generating one or more image frames of the scene by at least one second camera of the apparatus in the first mode; and means for selecting at least one image frame from the one or more image frames of the scene as at least one capture image in a second mode of the apparatus.

In a fifth aspect, there is provided a computer program comprising program instructions which when executed by an apparatus, cause the apparatus to: generate a preview of a scene by a first camera of an apparatus in a first mode of the apparatus; generate one or more image frames of the scene by at least one second camera of the apparatus in the first mode; and select at least one image frame from the one or more image frames of the scene as at least one capture image in a second mode of the apparatus.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 5 of the drawings.

Figure 1:
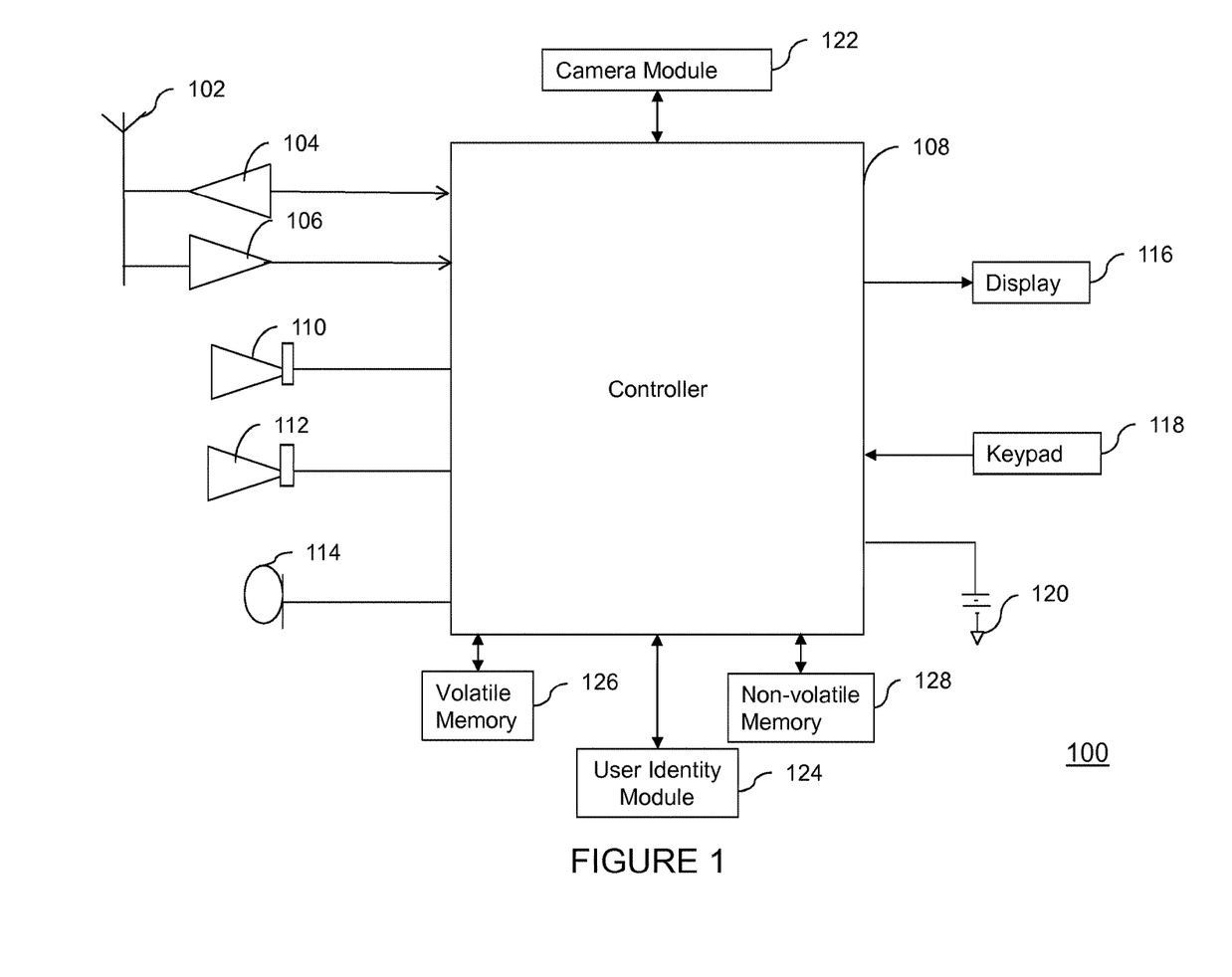
FIG. 1 illustrates a device, in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
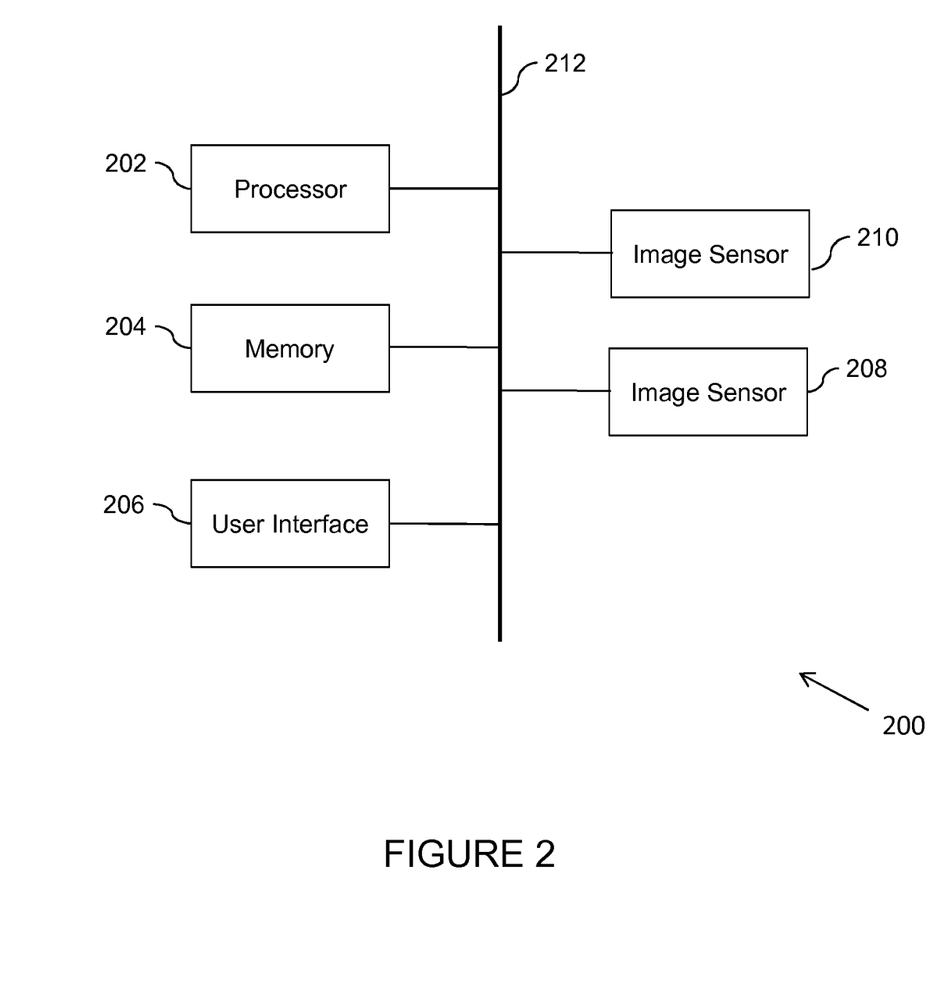
FIG. 2 illustrates an apparatus for facilitating capturing image, in accordance with an example embodiment.

FIG. 2 illustrates an apparatus 200 for facilitating capturing images, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with or without communication capabilities, computing devices, and the like. Some examples of the electronic device may include a mobile phone, a personal digital assistant (PDA), and the like. Some examples of computing device may include a laptop, a personal computer, and the like. In an example embodiment, the electronic device may include a user interface, for example, the UI 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive media content. Examples of media content may include audio content, video content, data, and a combination thereof.

In an example embodiment, the electronic device may be embodied as to include a plurality of image sensors, for example, an image sensor 208 and image sensor 210. Though only two image sensors 208 and 210 are shown in the example representation of FIG. 2, but the electronic device may include more than two image sensors. The image sensors 208 and 210 may be in communication with the processor 202 and/or other components of the apparatus 200. The image sensors 208 and 210 may be in communication with other imaging circuitries and/or software, and are configured to capture digital images or to make videos or other graphic media files. The image sensors 208 and 210 and other circuitries, in combination, may be an example of at least one camera module such as the camera module 122 of the device 100. The image sensors 208 and 210, along with other components may also be configured to capture a plurality of images depicting a scene from a same position or from different positions (with same or different angles). In an example embodiment, the image sensors 208 and 210 may be accompanied with corresponding lenses pointing towards same direction of the scene so that field of view of both the image sensors 208 and 210 are aligned together.

These components (202-210) may communicate to each other via a centralized circuit system 212 to facilitate capturing images of a scene. The centralized circuit system 212 may be various devices configured to, among other things, provide or enable communication between the components (202-210) of the apparatus 200. In certain embodiments, the centralized circuit system 212 may be a central printed circuit board (PCB) such as a motherboard, main board, system board, or logic board. The centralized circuit system 212 may also, or alternatively, include other printed circuit assemblies (PCAs) or communication channel media.

In an example embodiment, the processor 202 is configured to, with the content of the memory 204, and optionally with other components described herein, to cause the apparatus 200 to generate a preview of a scene by a first camera of the apparatus 200 in a first mode. In an example embodiment, the first camera comprises the image sensor 208 and other components to generate the preview of the scene. Herein, the scene refers to arrangement (natural, manmade, sorted or assorted) of one or more objects of which the images or videos can be captured, or of which the preview can be generated. Herein, the scene as referred throughout the description may also represent a scene that is dynamically displayed as in the preview. In an example embodiment, the first camera receives an instruction for initiating the first mode for generating the preview. For example, if a user triggers a half shutter using the user interface, (for example, the user interface 206), the first camera comprising the image sensor 208 generates a preview. In an example embodiment, the user interface 206 may include, but is not limited to, a shutter button, a touch input, a voice based input, a gesture based input and the like. In an example embodiment, the preview is displayed on a display unit, such as the display 116 (see, FIG. 1). In an example embodiment, the first mode may include a preview mode of the apparatus 200, and herein, the preview represents continuously and directly projected images of the scene that is displayed on the display unit (also referred to as viewfinder of the first camera), and the displayed preview dynamically changes if the first camera of the apparatus 200 is pointed to a different direction or position (for example, pointing to a slightly different scene). For example, if the user points the first camera of the apparatus 200 to a particular object (for example, a car), the first camera generates a preview of the car and outputs the preview of the car to the display unit. Further, if the user moves the first camera of the apparatus 200 pointing to a different object (for example, a bird) located at a different position, the first camera generates a preview of the bird and outputs the preview of the bird to the display unit. In an example embodiment, a processing means may be configured to generate a preview of one or more object of the scene and outputs the preview to the display unit. An example of the processing means may include the processor 202, which may be an example of the controller 108, and/or the image sensors 208 and 210.

In an example embodiment, the processor 202 is configured to, with the content of the memory 204, and optionally with other components described herein, to cause the apparatus 200 to generate one or more image frames of the scene by at least one second camera of the apparatus 200 in the first mode (for example, the preview mode). In an example embodiment, the second camera comprises the image sensor 210 and associated components to generate the one or more image frames of the scene while the preview of the scene is generated by the first camera. In an example embodiment, the at least one second camera receives the instruction for initiating the preview mode for generating the one or more image frames of the scene. For example, if the user initiates the preview mode (for example, by using a user interface for example, the user interface 206 or by pressing a mechanical camera button), the preview of the scene is generated by the first camera and displayed at the display unit. In an example embodiment, while the preview is being generated, the one or more image frames of the scene are also generated by the second camera comprising the image sensor 210. In an example embodiment, the sensor field of views of the sensor 208 (of the first camera) and the sensor 210 (of the second camera) are aligned. In an example embodiment, the one or more image frames of the scene that are generated by the second camera may be same or different from each other, or may be generated with different image characteristics/parameters.

In an example embodiment, the one or more image frames of the scene are stored in a buffer, for example, a ring buffer. In an example embodiment, the apparatus 200 may comprise more than two cameras with corresponding image sensors. In this example embodiment, only one camera of the at least one second camera (for example, the camera including the second sensor 210) is shown for example representation, but it should be noted that multiple second cameras may be used to generate the one or more frames of the scene. For example, if the apparatus 200 comprises four cameras with each camera comprising an image sensor, one camera out of the four cameras may act as the first camera that may be used for generating the preview of the object of the scene, and remaining three cameras (collectively acting as the at least one second camera) may be used to generate the one or more image frames of the scene. The one or more image frames generated by the at least one second camera (for example, the three cameras) are stored in the ring buffer. In an example embodiment, by collectively using the three cameras, frame rate for generating one or more image frames may be varied (for example, increased). In an example embodiment, a processing means may be configured to generate one or more image frames of the scene and is configured to store the one or more image frames of the scene in the ring buffer. An example of the processing means may include the processor 202, which may be an example of the controller 108, and/or the image sensors 208 and 210.

In an example embodiment, the apparatus 200 is caused to generate the preview at a frame rate (for example, first frame rate) by the first camera that is more than a frame rate (for example, second frame rate) at which the one or more image frames of the scene are generated by the at least one second camera. In other example embodiments, the first frame rate may also be equal to the second frame rate. In an example embodiment, the first camera comprising the image sensor 208 is configured to generate the preview at standard resolution with frame rates, for example, 30 frames per second (fps) or 15 fps. In an example embodiment, the at least one second camera comprising at least one image sensor, such as the image sensor 210 is configured to generate the one or more image frames of the scene with a full sensor resolution and at a less frame rate. It should be appreciated that as the generation of the preview and the one or more image frames of the scene is performed with different sensors, so that frame rates can be selected independently based on the various camera parameters. Examples of the various camera parameters may include, but are not limited to, an exposure time, a camera lighting, a camera movement and a local object movement in the scene.

In an example embodiment, the processor 202 is configured to, with the content of the memory 204, and optionally with other components described herein, to cause the apparatus 200 to select at least one image frame from the one or more image frames (that are generated during the preview mode) as at least one capture image of the scene in a second mode. In an example embodiment, the second mode is a capture mode of the apparatus 200. In an example embodiment, the apparatus 200 is configured to receive an instruction for initiating the second mode (for example, the capture mode) for selecting the at least one image frame from the one or more image frames as the at least one capture image. For example, if the apparatus 200 receives the capture instruction (for example, upon user initiating a full shutter using the user interface, such as the user interface 206), a capture event is generated causing the apparatus 200 to select the at least one image frame from the one or more image frames (associated with the preview of the scene) that are stored in the ring buffer. In an example embodiment, the at least one image frame, that is selected from the one or more image frames, is the at least one capture image of the scene with zero shutter lag. In an example embodiment, the at least one capture image is stored in a storage unit, such as the memory 204 or other storage locations such as the volatile memory 126 or the non-volatile memory 128 of the device 100 (see, FIG. 1).

In an example application, if the user points the apparatus 200 to a particular object, for example, a car, and starts the capture mode (for example, by triggering the half shutter using the user interface 206) a preview of the car is generated by the first camera of the apparatus 200 and the preview is displayed at the display unit. In an example embodiment, during the preview mode, the second camera of the apparatus 200 generates one or more image frames of the car (for example, four image frames); and the one or more image frames of the car are stored in the ring buffer. In an example embodiment, if the user initiates the capture mode (for example, by triggering the full shutter using the user interface 206), the apparatus 200 is caused to initiate the capture mode. In the capture mode, the apparatus 200 is caused to select at least one image frame from the four image frames as at least one capture image. The apparatus 200 stores the at least one capture image in the storage unit. In an example embodiment, after storing the at least one capture image in the storage unit, the apparatus 200 is caused to erase content of the ring buffer (for example, the one or more image frames of the scene generated by the second camera) to allow the ring buffer to store a new set of one or more image frames associated with a new preview of the same scene or a preview of a different scene generated by the second camera. In an example embodiment, a processing means may be configured to select the at least one image frame from the one or more image frames of the scene as the at least one capture image in the capture mode. An example of the processing means may include the processor 202, which may be an example of the controller 108, and/or the image sensors 208 and 210.

Figure 3:
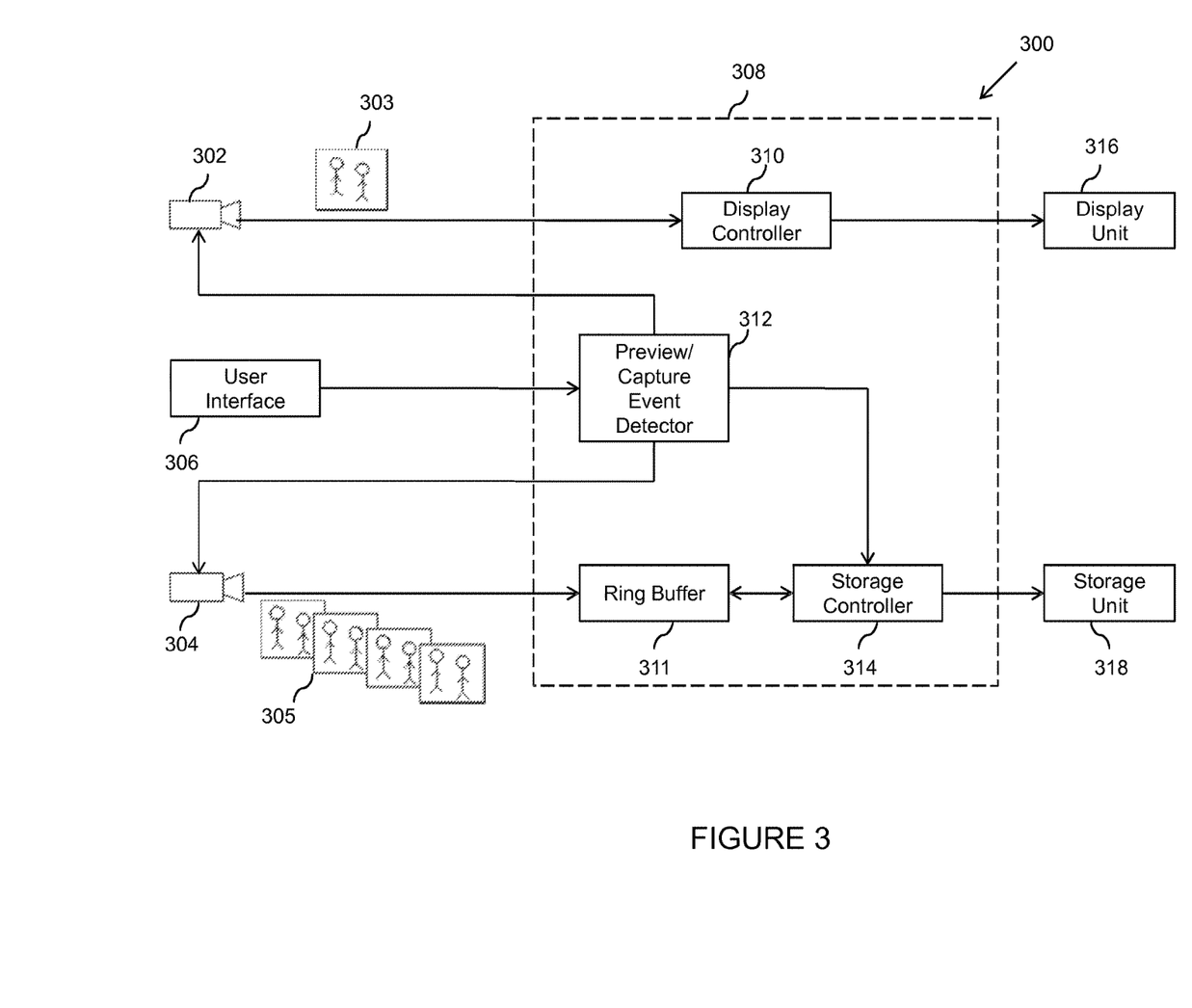
FIG. 3 illustrates an exemplary block diagram of an apparatus for facilitating capturing images, in accordance with another example embodiment.

An example embodiment of facilitating image capture with zero shutter lag is further described in reference to FIG. 3, and the FIG. 3 represents as an example embodiment only, and should not be considered limiting to the scope of the various example embodiments.

FIG. 3 illustrates an exemplary block diagram 300 of an apparatus for facilitating capturing images, in accordance with an example embodiment. The exemplary block diagram 300 represents a block diagram of an apparatus, for example, the apparatus 200. In an example embodiment shown in the block diagram 300, a dual camera setup comprises a first camera 302 used for generating a preview 303 of a scene and a second camera 304 used for generating one or more image frames 305 of the scene. In FIG. 3, the dual camera setup is represented as an example embodiment only, and should not be considered limiting to the scope of various example embodiments. For instance, the camera setup may comprise more than two cameras where one camera may be used to generate the preview, whereas the remaining cameras may be used for generating the one or more image frames of the scene for storage.

In an example embodiment, a processing means 308 (of the apparatus for example, the apparatus 200) includes a display controller 310, a ring buffer 311, a preview/capture event detector 312 and a storage controller 314. The processing means 308 may be an example of the processor 202 alone or in combination with the memory 204. In an example embodiment, the user triggers the preview mode through a user interface 306 (an example of the UI 206). In some example embodiments, the preview mode may be triggered by automatic means or semi-automatic means, for example, by using computer implemented instructions and operations, with or without user input. Further, the preview/capture event detector 312 detects the preview event and the first camera 302 is instructed to generate the preview 303 of the scene. The display controller 310 controls a display unit 316 to display the preview (for example, shown as 303) of the scene generated by the first camera 302. In an example embodiment, the display unit 316 may be an example of the display 116 of the device 100. In an example embodiment, the second camera 304 receives an instruction in the preview mode to generate the one or more image frames (for example, shown as 305) of the scene while the preview of the scene is taken from the first camera 302. For instance, the first camera 302 is configured to generate the preview 303 of the scene and the second camera 304 is configured to generate the one or more frames 305 of the scene during the preview mode. In an example embodiment, the one or more image frames 305 of the scene are stored in the ring buffer 311. An example of the ring buffer 311 is a data structure that typically includes a contiguous array of data cells as well as a read pointer and a write pointer. If the data (an image frame of the one or more image frames) is fed to at the ring buffer 311, the data is stored in the ring buffer 311 using the write pointer and advances through the array and stores consecutive data items in consecutive locations in the array. If the write pointer reaches the end of the array, the write pointer loops back to the beginning of the array.

In an example embodiment, the user triggers the capture mode through the user interface 306, for example, by initiating a full shutter mode. In some example embodiments, the capture mode may be triggered by automatic means or semi-automatic means, for example, by using computer implemented instructions and operations, with or without user input. In an example embodiment, the preview/capture event detector 312 detects the capture event and the storage controller 314 selects at least one image frame from the one or more image frames 305 that are stored in the ring buffer 311. In an example embodiment, the at least one image frame selected from the one or more image frames 305 is at least one capture image of the scene. In an example embodiment, the storage controller 314 controls a storage unit 318 to store the at least one capture image. The storage unit 318 may be an example of the volatile memory 126 or the non-volatile memory 128 of the device 100 (FIG. 1). After the capture image is stored in the storage unit 318, the storage controller 314 controls the ring buffer 311 to erase data that are stored in the ring buffer 311 so that a new set of one or more image frames associated with a preview of a new scene can be stored in the ring buffer 311. In some example embodiments, if the capture event is not detected by the preview/capture event detector 312, the storage controller 314 controls the ring buffer 311 to erase the data stored in the ring buffer 311 instead of selecting the at least one image frame as the capture image.

In an example embodiment, the apparatus 200 is caused to generate the preview 303 by the first camera 302 at a frame rate higher than a frame rate at which the one or more image frames 305 of the scene are generated by the second camera 304. For example, the first camera 302 is configured to generate the preview 303 at a higher frame rate (for example, at 30 fps or 15 fps) at a preview resolution, for example, at a resolution less than a full resolution of a sensor of the first camera 302. In an example embodiment, the second camera 304 is configured to generate the one or more image frames 305 at a lower frame rate (for example, 2 fps) at full sensor resolution. It should be appreciated that the sensor used in the first camera 302 may be of resolution less than that of the sensor used in the second camera 304. In so much, as the one or more image frames 305 are generated by a camera (the second camera 304) that is different from the camera used for the preview (the first camera), the resolution and frame rate associated with the one or more image frames 305 may be varied/adjusted based on specific requirements. For instance, the resolution and frame rate of generation of the image frames 305 may be varied based on various camera parameters and imaging environment. Examples of the camera parameters and imaging environment comprise an exposure time, a camera lighting, a camera movement a local object movement in the scene, time of the day, lighting conditions, and the like. For example, the frame rate at which the one or more image frames 305 of the scene are generated may be 5 fps in daylight conditions and 2 fps in low light conditions. In some example embodiments, the apparatus 200 may comprise more than two cameras having corresponding image sensors. For example, the apparatus 200 may include a four camera setup where each camera includes an image sensor. In this example embodiment, one camera from the four camera setup may be used to generate the preview 303 whereas the remaining three cameras may collectively be used to generate the one or more image frames 305. It should be noted that in an embodiment, the processor 202 is configured to, with the content of the memory 204, and optionally with other components described herein, to perform functions of the display controller 310, the ring buffer 311, the preview/capture event detector 312, and the storage controller 314.

Figure 4:
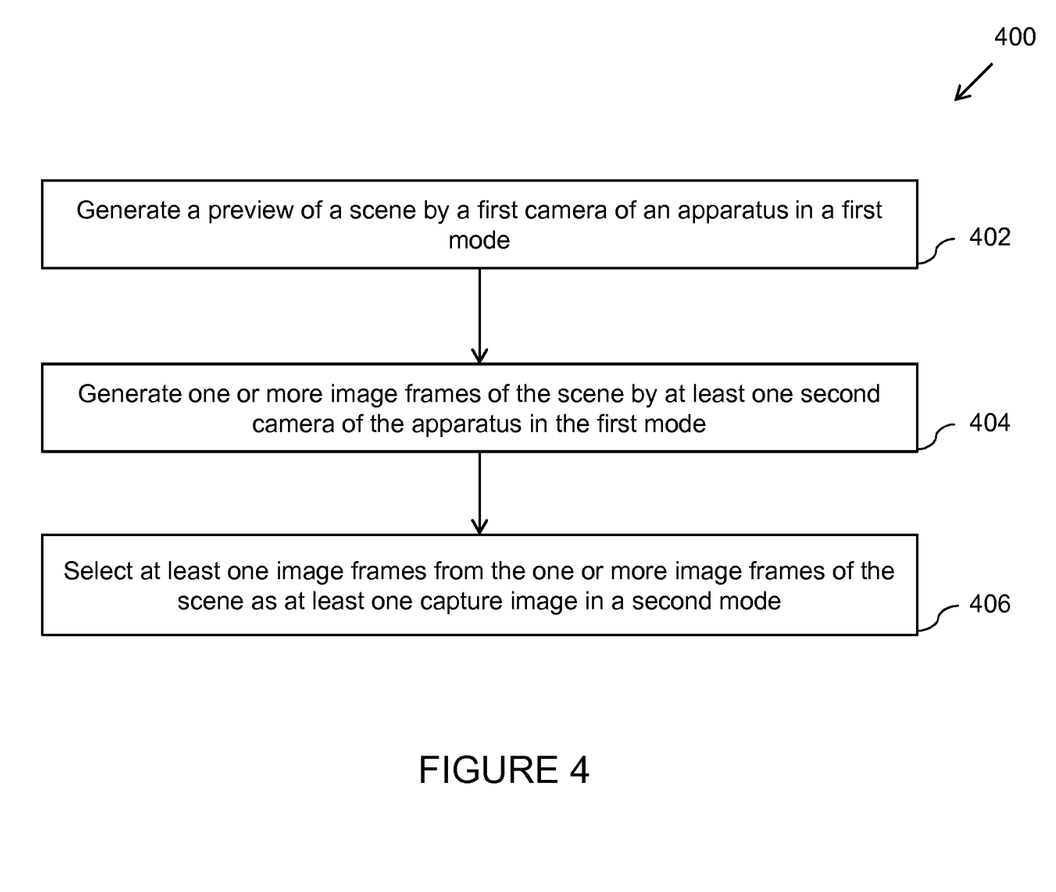
FIG. 4 is a flowchart depicting an example method for facilitating capturing images, in accordance with an example embodiment.

FIG. 4 is a flowchart depicting an example method 400 for facilitating capturing images, in accordance with an example embodiment. In an example embodiment, the method 400 includes generating a preview (for example, the preview 303) of a scene using a camera (for example, the first camera 302) and generating one or more images (for example, the image frames 305) of the scene using one or more separate cameras (for example, the second camera 304) in a first mode (for example, a preview mode), and selecting at least one image from the one or more images as a capture image in a second mode (for example, a capture mode). The method 400 is shown and explained with reference to FIGS. 2 and 3. The method 400 depicted in the flow chart may be executed by, for example, the apparatus 200 of FIG. 2.

At block 402, the method 400 includes generating the preview by a first camera of the apparatus in a first mode. In an example embodiment, the first mode is a preview mode of the apparatus, in which a preview is generated and displayed at the apparatus. As described with reference to FIG. 3, the first camera receives an instruction for initiating the preview mode. In an example embodiment, upon receiving the instruction for the preview mode, the preview of the scene is generated by the first camera. In an example embodiment, the method 400 includes displaying the preview of the scene on a display unit such as the display unit 316.

At block 404, the method 400 includes generating the one or more image frames of the scene by a second camera of the apparatus in the preview mode. As described with reference to FIG. 3, the second camera comprising an image sensor receives an instruction for initiating the preview mode when the preview event is detected by a preview/capture event detector. After the preview event is detected, the second camera generates the one or more image frames of the scene. In an example embodiment, the one or more image frames of the scene are stored in a buffer such as the ring buffer 311. In some example embodiments, the operations of the block 402 and 404 are performed simultaneously, for example, while the preview is generated from the first camera, the one or more image frames are also generated from the second camera in the preview mode.

At 406, the method 400 includes selecting at least one image frame from the one or more image frames of the scene as at least one capture image in a second mode. In an example embodiment, the second mode is a capture mode of the apparatus. As described with reference to FIG. 3, the apparatus receives an instruction for initiating the capture mode for selecting the at least one image frame from the one or more image frames that are stored in a ring buffer of the apparatus. In an example embodiment, as a capture event is detected at the apparatus, the at least one image frame of the one or more image frames is selected as the at least one capture image.

Figure 5:
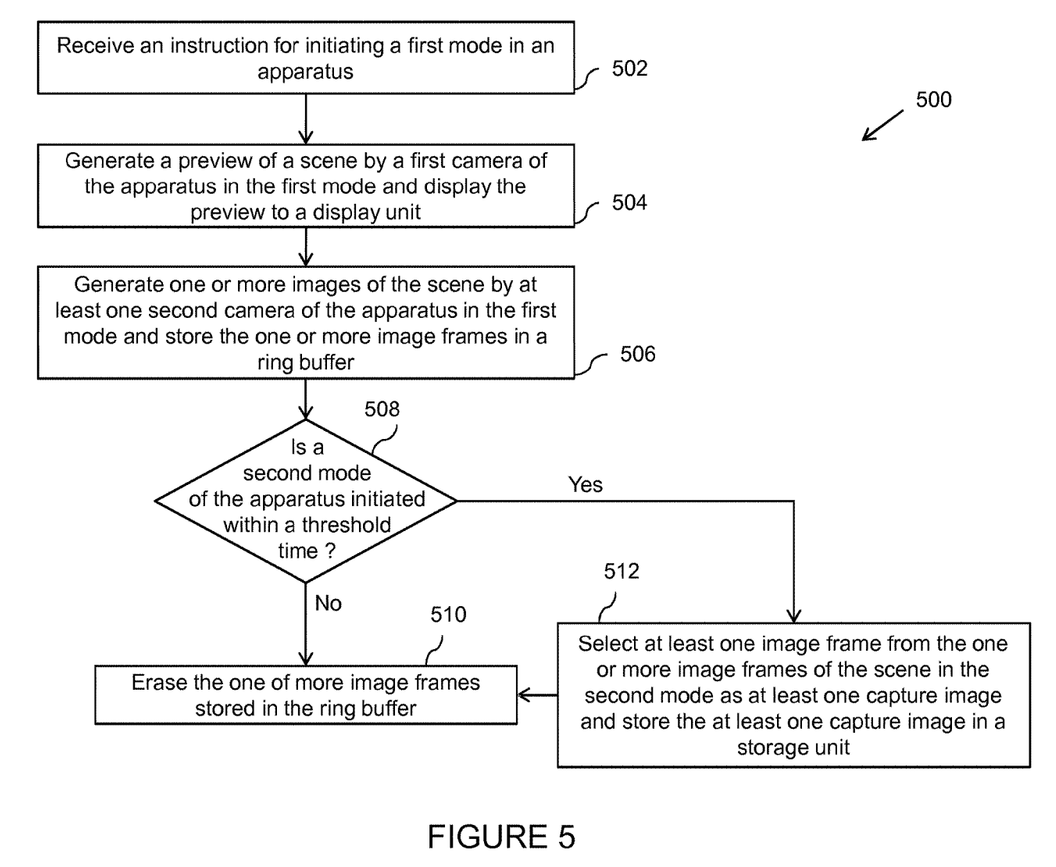
FIG. 5 is a flowchart depicting an example method for facilitating capturing images with zero shutter lag, in accordance with another example embodiment.

FIG. 5 is a flowchart depicting an example method 500 for facilitating capturing images with zero shutter lag, in accordance with another example embodiment. The method 500 depicted in the flow chart may be executed by, for example, the apparatus 200 of FIG. 2.

At block 502, the method 500 includes receiving an instruction for initiating a first mode. In an example embodiment, the first mode is a preview mode of the apparatus, in which a preview of the scene is generated and displayed. In an example embodiment, if a user (or any semi or full automatic means) initiates the preview mode (for example, using a half shutter) of the apparatus, a camera such as a first camera (for example, the camera 302) and a second camera (for example, the camera 304) are activated.

At block 504, the method 500 includes generating a preview (for example, the preview 303) by the first camera of the apparatus in the preview mode and the preview is displayed on a display unit. At block 506, the method 500 includes generating one or more image frames (for example, the image frames 305) of the scene by the second camera of the apparatus in the preview mode and storing the one or more image frames in a buffer (for example, the ring buffer 311).

At block 508, the method 500 includes checking whether a second (for example, a capture mode) is initiated in the apparatus or not. In an example embodiment, if the capture mode is not initiated (for example, the full shutter is not triggered) within a threshold time, at block 510, content of the ring buffer (for example, the stored one or more image frames that are generated by the second camera) is erased.

If the capture mode is initiated at the apparatus, the method 500 (at block 512) includes selecting at least one image frame from the one or more image frames as at least one capture image of the scene in the capture mode. In an example embodiment, the method 500 also includes storing the at least one capture image in a storage unit. In an example embodiment, after storing the at least one capture frame in the storage unit, the method 500 (at block 510) includes erasing the content of the ring buffer to store the one or more image frames associated with the preview of a new scene.

It should be noted that to facilitate discussions of the flowcharts of FIGS. 4 and 5, certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the methods 400 and 500 are performed in an automated fashion. These operations involve substantially no interaction with the user. Other operations of the methods 400 and 500 may be performed by in a manual fashion or semi-automatic fashion. These operations involve interaction with the user via one or more user interface presentations.

The methods depicted in these flow charts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus, provide operations for implementing the operations in the flowchart. The operations of the methods are described with help of apparatus 200. However, the operations of the methods can be described and/or practiced by using any other apparatus.

Without in any way limiting the scope, interpretation, or application of the claims appearing below, a technical effect of one or more of the example embodiments disclosed herein is to facilitate image capture with zero shutter lag in various electronic devices. Various embodiments provide techniques for the zero shutter lag for cameras having large sensors. For instance, the image frames of a scene are captured using two different sensors with one camera generating a preview with typical sensor resolution (for example, 30 fps or 15 fps) and the other camera is used to generate one or more image frames of the scene with full sensor resolution. Thus, the capture image selected from the one or more image frames will have the full sensor resolution. Further, various embodiments provide techniques to utilize the zero shutter lag in low light conditions and also to enhance quality of the capture image in normal lighting conditions.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

What is claimed is:

1. A method comprising:
generating by a first camera of an apparatus, in a preview mode of the apparatus, a first plurality of image frames at a first frame rate to provide a preview of a scene at a first resolution;
generating by at least one second camera of the apparatus, in the preview mode of the apparatus during a time of generating the first plurality of image frames, a second plurality of image frames of the scene at a second frame rate at a second resolution,
wherein the second resolution is a higher resolution than the first resolution, and
wherein the at least one second camera is different from the first camera of the apparatus, and wherein a field of view of the first camera and a field of view of the at least one second camera are aligned;
determining whether a capture mode of the apparatus is initiated within a threshold time; and
in response to determining that the capture mode is initiated within the threshold time, selecting in the capture mode of the apparatus at least one image frame from the second plurality of image frames of the scene generated by the at least one second camera as at least one capture image of the scene with zero shutter lag,
where the first frame rate of the first camera is x frames per second, the second frame rate of the at least one second camera is y frames per second, where x is greater than y and where y is greater than one.

2. The method as claimed in claim 1, wherein the preview is displayed on a user interface.

3. The method as claimed in claim 1, wherein generating the second plurality of image frames of the scene comprises storing the second plurality of image frames.

4. The method as claimed in claim 3, wherein the second plurality of image frames are stored in a ring buffer, further comprising:
in response to determining that the capture mode is not initiated within the threshold time, erasing the second plurality of image frames after a threshold time.

5. The method as claimed in claim 1, wherein the second frame rate is varied based on camera parameters comprising at least one of an exposure time, a camera lighting, a camera movement and an object movement in the scene.

6. The method as claimed in claim 1, further comprising:
receiving an instruction to initiate the preview mode to generate the first plurality of image frames and provide the preview of the scene; and
receiving an instruction to initiate the capture mode to select the at least one image frame from the second plurality of image frames of the scene as the at least one capture image.

7. The method as claimed in claim 1, wherein the preview mode of the apparatus is triggered by a user performing a half shutter operation using a user interface of the apparatus, and wherein the capture mode of the apparatus is triggered by the user performing a full shutter operation using the user interface of the apparatus.

8. An apparatus comprising:
at least one processor; and
at least one memory comprising computer program code, the at least one memory and the computer program code configured to, with the at least one processor, cause the apparatus to at least perform:
generate by a first camera of the apparatus, in a preview mode of the apparatus, a first plurality of image frames at a first frame rate to provide a preview of a scene at a first resolution;
generate by at least one second camera of the apparatus, in the preview mode of the apparatus during a time of generating the first plurality of image frames, a second plurality of image frames of the scene at a second frame rate at a second resolution,
wherein the second resolution is a higher resolution than the first resolution, and
wherein the at least one second camera is different from the first camera of the apparatus, and wherein a field of view of the first camera and a field of view of the at least one second camera are aligned;
determine whether a capture mode of the apparatus is initiated within a threshold time; and
in response to determining that the capture mode is initiated within the threshold time, select in the capture mode of the apparatus at least one image frame from the second plurality of image frames of the scene generated by the at least one second camera as at least one capture image of the scene with zero shutter lag,
where the first frame rate of the first camera is x frames per second, the second frame rate of the at least one second camera is y frames per second, where x is greater than y and where y is greater than one.

9. The apparatus as claimed in claim 8, wherein the preview is displayed on a user interface.

10. The apparatus as claimed in claim 8, wherein the apparatus is further caused to store the second plurality of image frames.

11. The apparatus as claimed in claim 8, wherein the second frame rate is varied based on camera parameters comprising at least one of an exposure time, a camera lighting, a camera movement and an object movement in the scene.

12. The apparatus as claimed in claim 8, wherein the apparatus is further caused, at least in part to:
receive an instruction to initiate the preview mode to generate the first plurality of image frames and provide the preview of the scene; and
receive an instruction to initiate the capture mode to select the at least one image frame from the second plurality image frames of the scene as the at least one capture image.

13. The apparatus as claimed in claim 8, wherein the preview mode of the apparatus is triggered by a user performing a half shutter operation using a user interface of the apparatus, and wherein the capture mode of the apparatus is triggered by the user performing a full shutter operation using the user interface.

14. The apparatus as claimed in claim 8, wherein the apparatus comprises a first image sensor configured to generate the first plurality of image frames of the scene at the first frame rate and at least one second image sensor configured to generate the second plurality of image frames of the scene at the second frame rate.

15. A computer program product comprising at least one non-transitory computer-readable storage medium, the non-transitory computer-readable storage medium comprising a set of instructions, which, when executed by one or more processors, cause an apparatus to at least perform:

generate by a first camera of the apparatus, in a preview mode of the apparatus, a first plurality of image frames at a first frame rate to provide a preview of a scene at a first resolution;

generate by at least one second camera of the apparatus, in the preview mode of the apparatus during a time of generating the first plurality of image frames, a second plurality of image frames of the scene at a second frame rate at a second resolution, wherein the second resolution is a higher resolution than the first resolution, wherein the at least one second camera is different from the first camera of the apparatus, and wherein a field of view of the first camera and a field of view of the at least one second camera are aligned;

determine whether a capture mode of the apparatus is initiated within a threshold time; and in response to determining that the capture mode is initiated within the threshold time, select in the capture mode of the apparatus at least one image frame from the second plurality of image frames of the scene generated by the at least one second camera as at least one capture image of the scene with zero shutter lag, where the first frame rate of the first camera is x frames per second, the second frame rate of the at least one second camera is y frames per second, where x is greater than y and where y is greater than one.

16. The computer program product as claimed in claim 15, wherein the second frame rate is varied based on camera parameters comprising at least one of an exposure time, a camera lighting, a camera movement and an object movement in the scene.

17. The computer program product as claimed in claim 15, wherein the apparatus is further caused, at least in part to:

receive an instruction to initiate the preview mode to generate the first plurality of image frames and provide the preview of the scene; and receive an instruction to initiate the capture mode to select the at least one image frame from the second plurality image frames of the scene as the at least one capture image.

18. The computer program product as claimed in claim 15, wherein the preview mode of the apparatus is triggered by a user performing a half shutter operation using a user interface of the apparatus, and wherein the capture mode of the apparatus is triggered by the user performing a full shutter operation using the user interface.

* * * * *